US009882229B2

(12) United States Patent
Stern

(10) Patent No.: US 9,882,229 B2
(45) Date of Patent: Jan. 30, 2018

(54) HYDROGEN GAS HIGH PRESSURE STORAGE SYSTEM

(71) Applicant: C. EN LTD., Kingston (VC)

(72) Inventor: Moshe Stern, Herzliya (IL)

(73) Assignee: C. EN LTD., Kingstown (VC)

( * ) Notice: Subject to any disclaimer, the term of this patent is extended or adjusted under 35 U.S.C. 154(b) by 113 days.

(21) Appl. No.: 14/428,985

(22) PCT Filed: Sep. 17, 2013

(86) PCT No.: PCT/IL2013/050788
§ 371 (c)(1),
(2) Date: Mar. 18, 2015

(87) PCT Pub. No.: WO2014/045282
PCT Pub. Date: Mar. 27, 2014

(65) Prior Publication Data
US 2015/0236362 A1    Aug. 20, 2015

Related U.S. Application Data

(60) Provisional application No. 61/702,951, filed on Sep. 19, 2012.

(51) Int. Cl.
*H01M 8/04*    (2016.01)
*C03B 23/207*    (2006.01)
(Continued)

(52) U.S. Cl.
CPC ....... *H01M 8/04216* (2013.01); *C03B 23/207* (2013.01); *F17C 1/00* (2013.01);
(Continued)

(58) Field of Classification Search
CPC ......... H01M 8/04216; H01M 8/04201; H01M 8/04208; F17C 1/00; F17C 2201/0104;
(Continued)

(56) References Cited

U.S. PATENT DOCUMENTS 4,098,124 A * 7/1978 Tardelius ............... G01K 5/025
374/1
2007/0072042 A1* 3/2007 Lam .................. H01M 8/04201
429/443
(Continued)

FOREIGN PATENT DOCUMENTS

WO    WO 2011/080746 A1    7/2011

OTHER PUBLICATIONS

Eleizer, D., et al., "An Innovative Technology for Hydrogen Storage in Portable and Mobile Systems," in Proceedings of the World Hydrogen Energy Conference, May 16-21, 2010, pp. 32-36.
(Continued)

*Primary Examiner* — Ula C Ruddock
*Assistant Examiner* — Matthew W Van Oudenaren
(74) *Attorney, Agent, or Firm* — Fenwick & West LLP

(57) ABSTRACT

A device for the storage of compressed hydrogen gas comprises a plurality of glass capillary tubes each having a sealed extremity and an open extremity, wherein said plurality of glass capillary tubes is sheathed in an external tubular cover, and wherein the open end of a bundle of said tubular covers is housed in an adaptor, and wherein said adaptor is suitable to allow compressed hydrogen gas to be added to, and to prevent said hydrogen gas from escaping from, said glass capillary tubes.

11 Claims, 5 Drawing Sheets

(51) Int. Cl.
*F17C 1/00* (2006.01)
*H01M 8/04082* (2016.01)

(52) U.S. Cl.
CPC .............. *F17C 2201/0104* (2013.01); *F17C 2201/0157* (2013.01); *F17C 2201/0161* (2013.01); *H01M 8/04201* (2013.01); *H01M 8/04208* (2013.01)

(58) Field of Classification Search
CPC ..... F17C 2201/0161; F17C 2201/0157; C03B 23/207
See application file for complete search history.

(56) References Cited

U.S. PATENT DOCUMENTS

| | | | |
|---|---|---|---|
| 2009/0120811 A1 | 5/2009 | Zhevago et al. | |
| 2010/0024542 A1* | 2/2010 | Yen | F17C 11/005 73/290 R |
| 2010/0059528 A1* | 3/2010 | Zhevago | F17C 1/00 220/592 |
| 2011/0094656 A1* | 4/2011 | Ferrari | C09J 5/10 156/158 |

OTHER PUBLICATIONS

Eleizer, D., et al., "A New technology for Hydrogen Storage in Capillary Arrays," Retrieved from the Internet at <http://web.archive.org/web/20110708131441/http:/www.cenh2go.com/PDF/CEnPoster_small.pdf>, on Aug. 7, 2011, 1 Page.
Holtappels, K., et al., "Hydrogen Storage in Glass Capillary Arrays for Portable and Mobile Systems," Sep. 16, 2009, 8 Pages.
Holtappels, K., et al., "A new storage technology for compressed hydrogen based on glass structures," BAM Federal Institute for Materials Research and Testing, in Proceedings of the World Hydrogen Energy Conference, Apr. 6, 2012, 17 Pages.
Meyer, R., et al., "A New Technology for Hydrogen Safety: Glass Structures as a Storage System," in the 4$^{th}$ International Conference on Hydrogen Safety (ICHS), Sep. 12, 2011, 12 Pages.
Patent Cooperation Treaty, International Search Report, International Patent Application No. PCT/IL2013/050788, Jan. 13, 2014, 6 Pages.
PCT Written Opinion, PCT Application No. PCT/IL2013/050788, dated Jan. 13, 2014, 6 pages.

* cited by examiner

HYDROGEN GAS HIGH PRESSURE STORAGE SYSTEM

FIELD OF THE INVENTION

The invention relates to a gas storage system and method. More particularly, the invention relates to a system comprising glass capillaries suitable to be inserted with gas in high pressure, contain it and allow its extraction.

BACKGROUND OF THE INVENTION

Hydrogen is often used as a fuel substance. It is highly recommended since it is non-toxic and therefore it is safe to produce, store (even in large amounts), and transport. There are many other advantages to hydrogen such as the fact that it is lighter than air, carbon-free, exceptionally clean, can be produced from a variety of resources, and the only byproducts are water and heat.

Hydrogen is often used in combination with fuel cells that are used all over the world. Stationary cells are often used for emergency power systems as a backup power supply system, and they are used in hospitals, nursing homes, office buildings, etc. Portable cells can supply power for cars, boats, submarines, spacecraft, etc. A fuel cell can also charge different kinds of batteries for a variety of electronic devices.

A fuel cell that comprises hydrogen is an electrochemical cell which converts chemical energy into electric current. The chemical reaction is created when the hydrogen comes into contact with an oxidant. When using hydrogen fuel cells, it is less noisy than in other fuel systems, and most importantly—there is no emission of hazardous materials.

Hydrogen must be stored in a suitable containing system, which can endure high pressure, resulting from containing compressed hydrogen. In order to deliver the hydrogen to different locations, the containing system should be portable. Nowadays, most containing systems that meet those requirements are built from metal materials, alloys and/or composites, and the use of such materials makes the containing system relatively heavy, and therefore limits its portability and range of uses.

WO2011/080746 teaches a storage tank comprising a plurality of hollow micro-cylinders having each an end sealed with a plug made of an easily meltable alloy and heating coils wound around the micro-cylinder ends, which are heated to melt the plug and thereby to liberate the hydrogen gas from said array. This type of arrangement is complex and presents practical problems that prevent it from being a satisfactory industrial solution.

Therefore, there is a need for a simple, efficient, refuelable and low-cost solution that would permit the storage of hydrogen gas in a relatively light-weight storage. It is an object of the invention to provide a system and method that overcome the drawbacks of the prior art.

Other objects and advantages of the invention will become apparent as the description proceeds.

SUMMARY OF THE INVENTION

A device for the storage of compressed hydrogen gas comprises a plurality of glass capillary tubes each having a sealed extremity and an open extremity, wherein said plurality of glass capillary tubes is sheathed in an external tubular cover, and wherein the open end of a bundle of said tubular covers is housed in an adaptor, and wherein said adaptor is suitable to allow compressed hydrogen gas to be added to, and to prevent said hydrogen gas from escaping from, said glass capillary tubes.

In one embodiment of the invention the bundle of tubular covers is connected to the adaptor at the open end with gluing material. In another embodiment of the invention the gluing material is an epoxy resin. The device may further comprise sealing material.

In one embodiment of the invention the adaptor is provided with a sealing valve, which may be integral with the adaptor or may be coupled thereto.

The invention is also directed to a method for generating a capillary tube with one closed end, which is suitable for use with the device of the invention, comprising providing an open-ended capillary tube, applying a glass cupping to one open end and then melting the glass at said end.

Further encompassed by the invention is a system for the storage of compressed hydrogen gas, comprising an array of two or more devices according to claim 1, said two or more devices being connected to a common conduit for the addition of gas to, and withdrawal of gas from, the storage devices.

Fuel cells comprising as the hydrogen-storage element one or more devices according to the invention, and their uses, also form part of the invention.

DETAILED DESCRIPTION OF THE INVENTION

The invention relates to a gas-containing system and method. The following description refers to hydrogen gas, but obviously the system may be exploited to store additional and/or alternative gases, as long as the pressure of said gases does not exceed the maximum pressure that the system can accommodate.

The gas is caused to flow into a thin glass tube, which will also be referred to herein as "capillary". The cross-section of the capillary can be round or of any other geometrical shape, such as a hexagonal.

The glass tubes are made of a material having high tensile strength $\sigma$ 20 and low mass density $\rho$. For example, materials that meet the condition $\sigma/\rho >\_1700$ MPa-cm3/g are suitable for the glass tubes. Examples of materials suitable for the capillary tubes include, but are not limited to, borosilicate glass, MgAlSi glass, S-2 Glass™, R-glass available from Saint-Gobain Vetrotex Textiles, T-Glass available from Nitto Boseki Co., Ltd. (Nittobo), fused quartz, polymers (e.g., Kevlar™, 25 TwaronXM), etc.

Generally, the glass tubes can have any desired length. The external diameter of the glass tubes can be in the range of about 1 micrometer to about 500 micrometers. A number of the capillary glass tubes in one MMC (see FIG. 2) can, for example, be in the range of 50 to 1,000,000. These dimensions of the capillaries are strongly dependent on pressure resistance, possibility of easy manufacturing etc. whereas the dimensions of the arrays (various number of MMC) are dependent on the manufacturing process, opening procedure and the actual application.

Methods for fabrication of hollow microcylinders (i.e., capillary glass tubes) and microcylindrical array structures are known per se. In particular, various microcylindrical (capillary) arrays made from glass and/or plastics are widely used in x-ray optics and photonics. Generally, the process of fabrication of microcylindrical arrays is divided into three main stages: (i) drawing capillaries with relatively large diameter, (ii) re-drawing them 10 into a bundle of capillaries with smaller diameter, and (iii) sintering capillaries into the array. Existing technology enables one to produce vast arrays with a capillary diameter down to 1 micron or even less, and a wall thickness-to-diameter ratio less than 5%. For example, capillary arrays suitable for the purpose of the present invention can be obtained from Paradigm Optics, Inc.; 9600 NE 126th Ave, Suite 2540 Vancouver, Wash. 98682 USA; Hilgenberg GmbH, Strauchgraben 2, D-34323 Malsfeld, Germany; INCOM 294 Southbridge Road, Charlton, Mass. 01507; etc.

Figure 1:
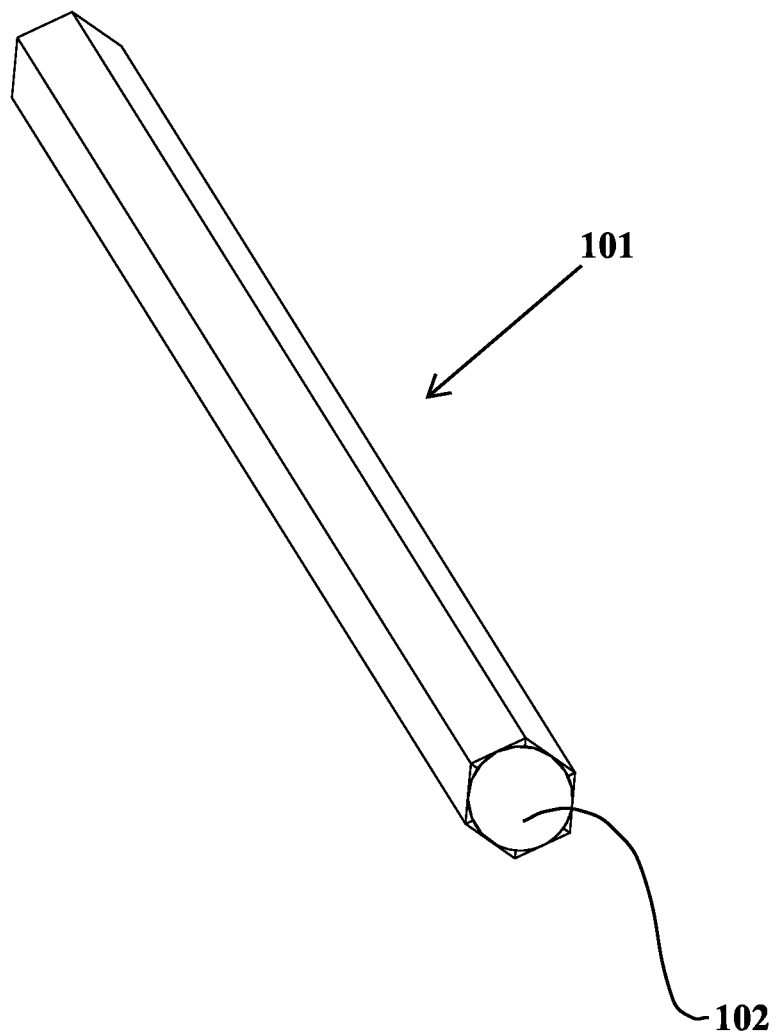
FIG. 1 is a perspective view of an MC ("multi-capillary" structure), according to one embodiment of the invention.

A group of capillaries is attached together to form a "multi-capillary" structure (MC). The MC outer cover also has a tubular shape. FIG. 1 shows an MC 101 with a hexagonal cross-section, according to one embodiment of the invention. One end of the MC 101 is sealed by a glass cupping element, which in this example is shaped as a half sphere 102, hereinafter—"half-sphere". For better orientation, the end that comprises a half-sphere is designated as the bottom. The connection between a tube and a half-sphere is performed by melting the glass while applying pressure on both parts, one against the other.

Figure 2:
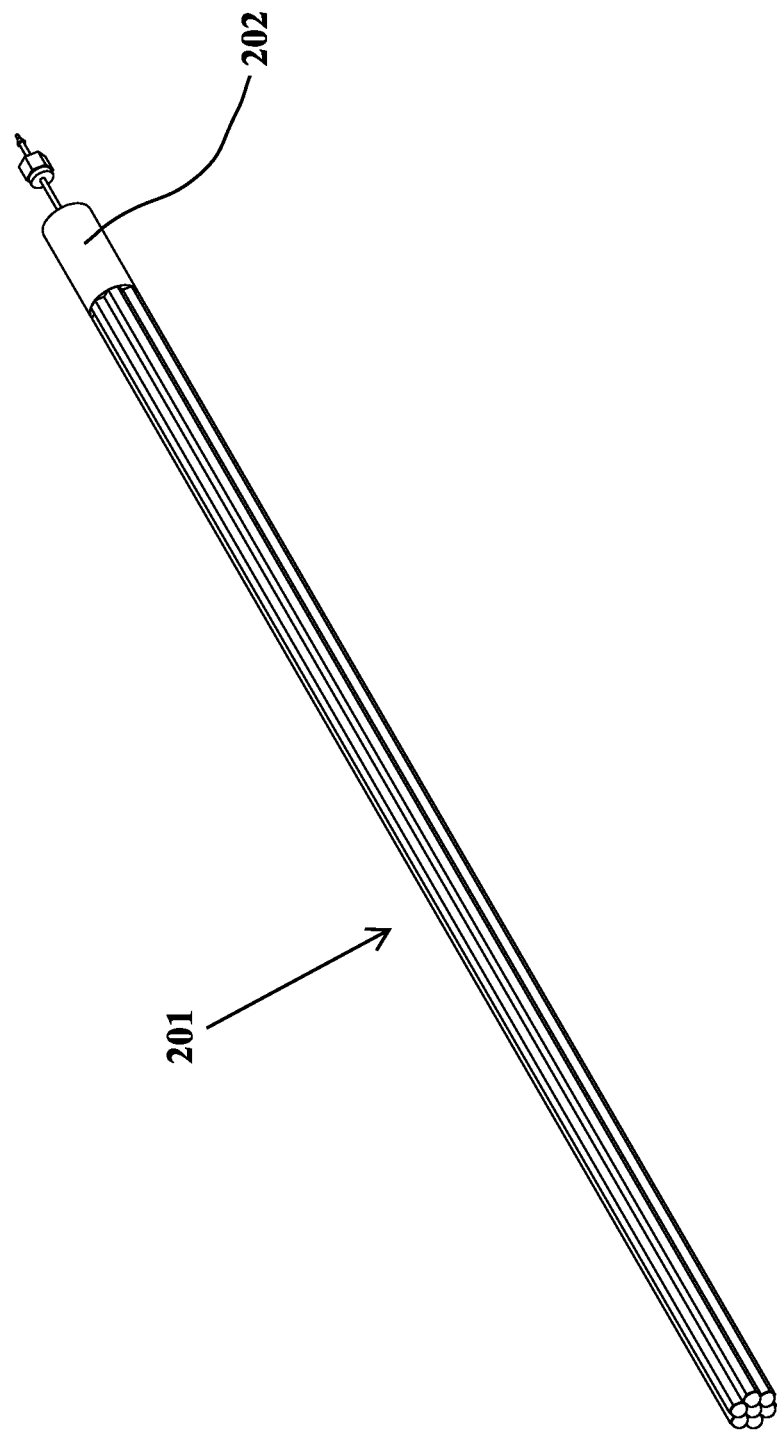
FIG. 2 is a perspective view of a group of MCs-MMC ("multi multi-capillary" structure) of FIG. 1.

As shown in FIG. 2, a number of MCs can be attached and form an even larger storage system—"multi-multi-capillary" (MMC). An MC or a group of MCs—MMC are connected to an adaptor at the open (top) end of the capillaries—a unit which allows the addition and release of a gas into and from each tube. A valve can be provided in the adaptor or connected thereto, to prevent gas from escaping from the storage. FIG. 2 shows an MMC 201 connected to an adaptor 202. The attachment of an MC or an MMC to an adaptor can be performed for example by a glue such as epoxy resin. If necessary after the attachment of the adaptor to the MC/MMC, an additional sealing material can be used. One example of a suitable adaptor is one that is made of stainless steel 1.4301 and designed to securely hold the glass-steel connection at pressure up to 40 MPa.

An exemplary adaptor made of SS 1.4301 has a wall thickness of 0.75 mm and is suitable to store gas at a pressure of up to 40 MPa, it is glued for a length of the glass sheath of 53 mm using Loctite 9483 A&B. The resin is cures at 30° C. for 24 hours.

Figure 3:
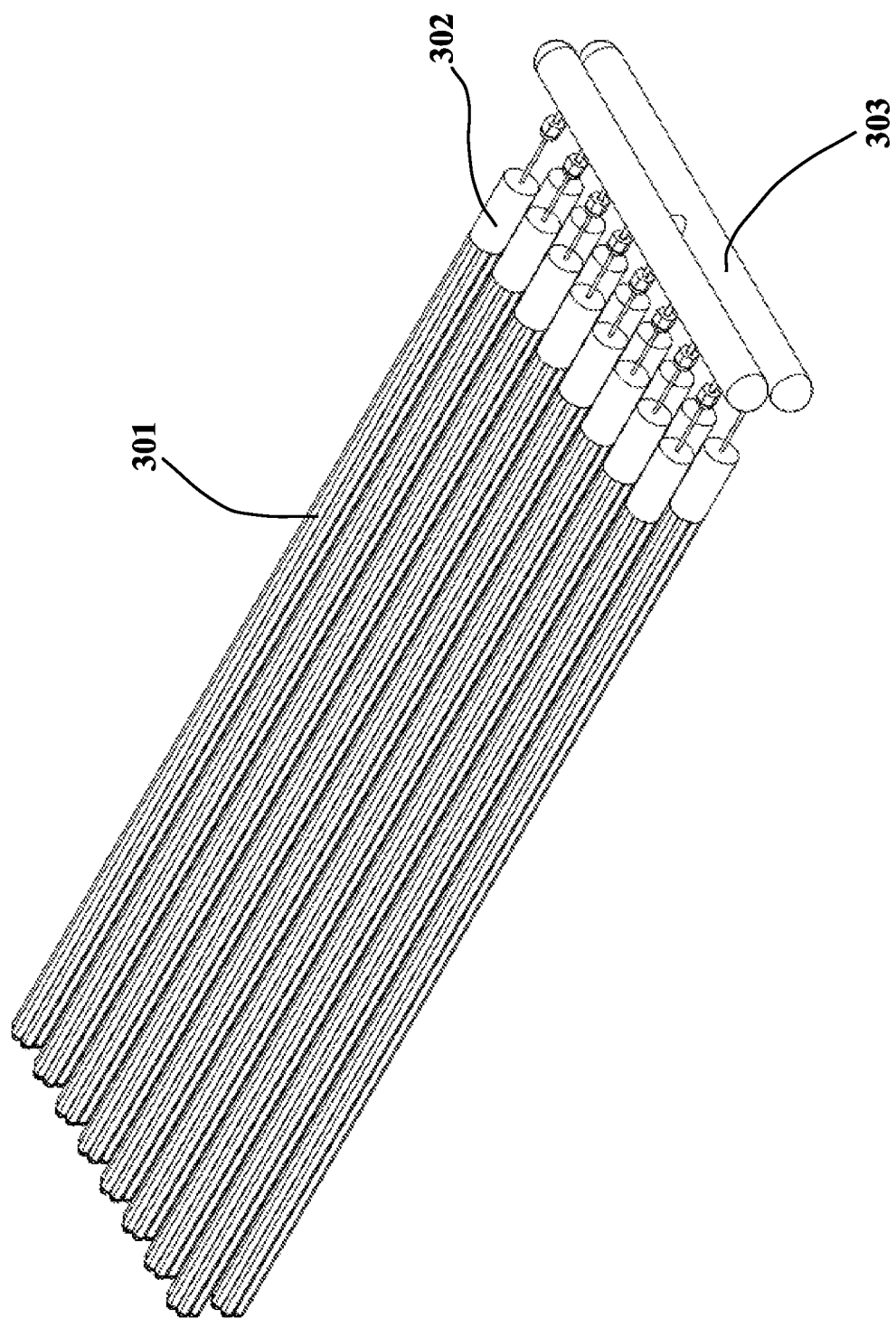
FIG. 3 is an array of MMCs, according to another embodiment of the invention.

As shown in FIG. 3, another form of storage system can be an array of MMCs, according to another embodiment of the invention. Every MMC 301 is connected to its own adaptor 302, and every adaptor is connected to a conduit 303. When all of the MMCs in the array are connected to one or more conduits, it provides for a convenient addition and extraction of gas into and from the storage system, and thus the procedure is performed only once for every group of MMCs connected to the same conduit 303.

Figure 4:
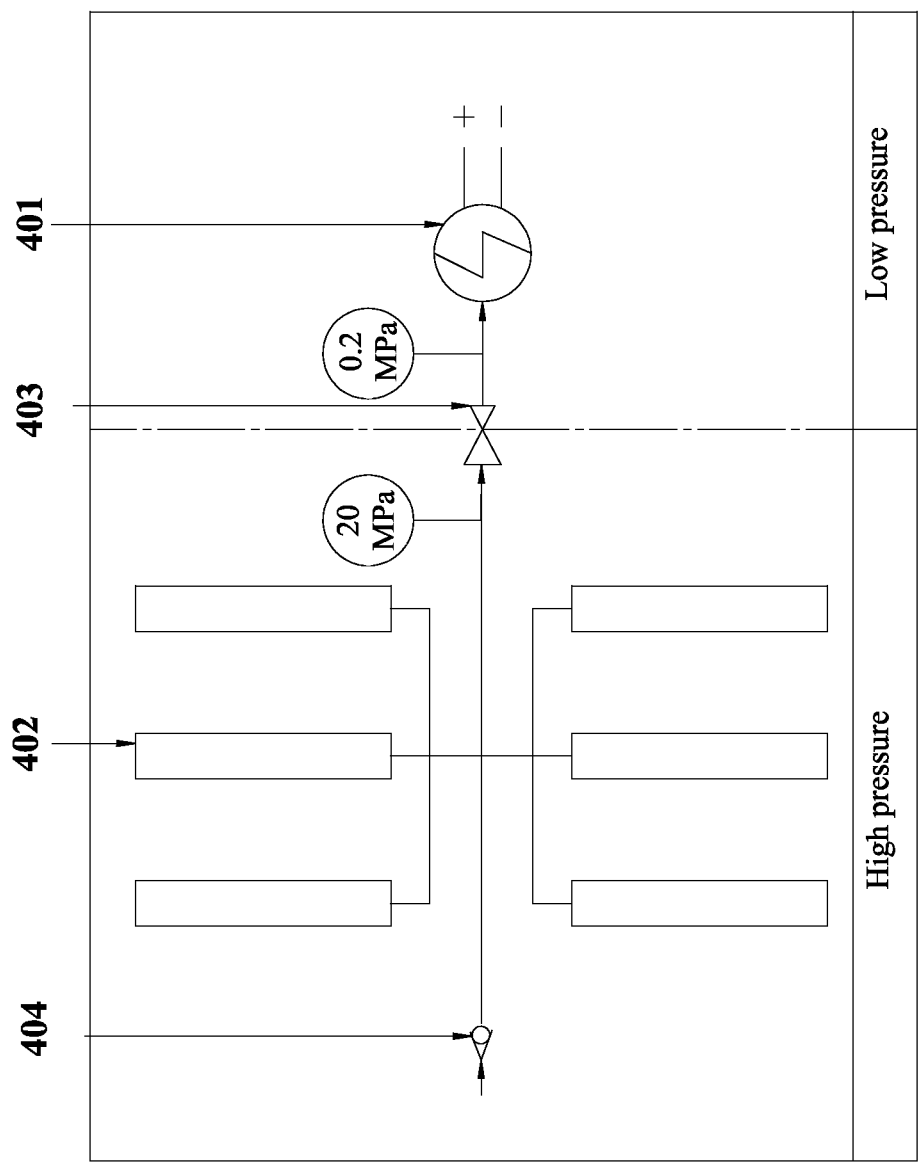
FIG. 4 is a diagram of a fuel-providing system comprising an array of MMC.

FIG. 4 is a diagram of a fuel-providing system comprising an array of MMC. The fuel cell 401 is where the chemical reaction occurs, but the gas used in the process needs to enter the fuel cell 401 at a relatively low pressure, for example 0.2 MPa, and since it leaves the MMCs 402 at a pressure of up to 20 MPa, in this illustrative scheme a pressure regulator 403 is provided between the fuel cell 401 and the MMCs 402. A fast coupling 404 can also be provided.

Figure 5:
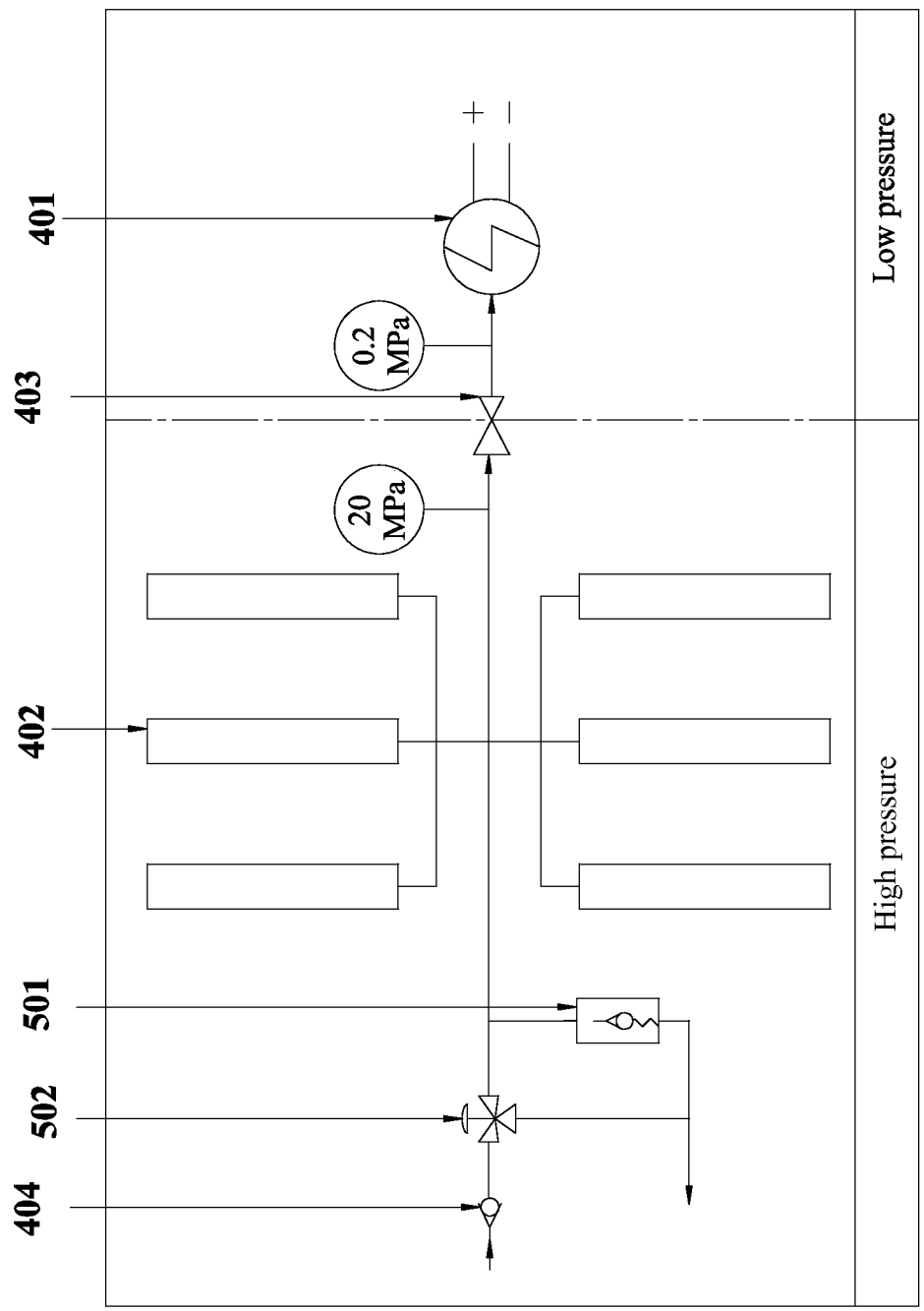
FIG. 5 is another diagram of a fuel-providing system further comprising a check valve and a release valve.

FIG. 5 is another diagram of a fuel-providing system further comprising a check valve 501 and a release valve 502. The additional two components are provided in this specific embodiment of the invention for safety reasons. The check valve 501 can detect hazardous situation relaying on pressure values measured by said valve 501. If the pressure in the system is too high, the release valve 502 is operated by check valve 501, for pressure release and regulation.

All the above description has been provided for the purpose of illustration and it is not meant to limit the invention in any way except as provided for by the appended claims.

The invention claimed is:

1. A device for the storage of compressed hydrogen gas, comprising a multi-capillary structure consisting of a plurality of glass capillary tubes each having a sealed extremity and an open extremity, wherein said plurality of glass capillary tubes are sheathed in an external tubular cover; and
   a plurality of said multi-capillary structures is bundled together such that the open end of the resulting bundle is housed in an adaptor, and wherein said adaptor is suitable to allow compressed hydrogen gas to be added to, and to prevent said hydrogen gas from escaping from, said glass capillary tubes.

2. A device according to claim 1, wherein the bundle of tubular covers is connected to the adaptor at the open end with gluing material.

3. A device according to claim 2, wherein the gluing material is an epoxy resin.

4. A device according to claim 3, further comprising sealing material.

5. A device according to claim 1, wherein the adaptor is provided with a sealing valve.

6. A device according to claim 5, wherein the valve is integral with the adaptor.

7. A device according to claim 5, wherein the valve is coupled to the adaptor.

8. The device of claim 1 wherein each capillary tube is formed by, applying a glass cupping to one open end of an open-ended capillary tube and then melting the glass at said end.

9. A system for the storage of compressed hydrogen gas, comprising an array of two or more devices, each comprising a multi-capillary structure consisting of a plurality of glass capillary tubes each having a sealed extremity and an open extremity, wherein said plurality of glass capillary tubes are sheathed in an external tubular cover; and
   a plurality of said multi-capillary structures is bundled together such that the open end of the resulting bundle is housed in an adaptor, and wherein said adaptor is suitable to allow compressed hydrogen gas to be added to, and to prevent said hydrogen gas from escaping from, said glass capillary tubes;
   said two or more devices being connected to a common conduit for the addition of gas to, and withdrawal of gas from, said devices.

10. A fuel cell comprising as the hydrogen-storage element one or more devices according to claim 1.

11. A fuel cell according to claim 10, for use in powering electronic devices.

* * * * *